April 22, 1958 B. OSTENDORF, JR 2,831,983

TRIGGER CIRCUIT

Filed June 11, 1952

INVENTOR
B. OSTENDORF, JR.
BY J. W. Schmied
ATTORNEY

United States Patent Office 2,831,983

Patented Apr. 22, 1958

2,831,983

TRIGGER CIRCUIT

Bernard Ostendorf, Jr., Stamford, Conn., assignor to Bell Telephone Laboratories, Incorporated, New York, N. Y., a corporation of New York Application June 11, 1952, Serial No. 292,875

20 Claims. (Cl. 307—88.5)

This invention relates to bistable trigger circuits and more particularly to a single transistor flip-flop trigger circuit.

Heretofore in the prior art various transistor trigger circuits have been utilized. Some of these circuits, as in the present invention, have a current-multiplication transistor as the central element. These current-multiplication transistors are of the type described in the article by R. M. Ryder and R. J. Kircher published in the Bell System Technical Journal for July 1949, at page 367 (vol. 28), or in Patent 2,524,035 to J. Bardeen and W. H. Brattain, dated October 3, 1950. The current-multiplication transistor, as described therein, comprises a block of semiconductive material, one surface of which has been treated to give it a conductivity of the type opposite to that of the remainder of the body. Two electrodes known as the emitter and the collector electrodes make point contact with the treated surface, while a third electrode known as the base electrode makes ohmic contact with the opposite surface. Electrode currents are designated positive if they flow into the semiconductive body. If the semiconductive body comprises N-type material with the treated surface being P-type, normal emitter current will be positive, and normal collector current will be negative, with the latter usually exceeding the former in magnitude. The base current being the algebraic sum of the two, will thus normally be positive.

The associated circuitry of the current-multiplication transistor generally includes a source of potential for the collector electrode, a feedback promoting resistor in series with the base, and a load-line resistor connected to the emitter. The current-voltage characteristic of the transistor and its base resistor, taken together, is a continuous curve having a central negative resistance portion bounded on either side by positive resistance portions. The system is monostable, astable, or bistable, depending on whether the load line, i. e., the volt-ampere characteristic of the emitter circuit, intersects the transistor characteristic in one of its positive resistance portions, in its central or negative resistance portion or in all three portions. To provide for the bistable circuit and the three intersections of the two characteristics, the values of the transistor and associated circuitry are fairly critical. For a given type of transistor, only a narrow range of emitter resistors will provide for the three intersections of the characteristics. Moreover, the transistors vary, which further reduces the range of successful bistable operation. An additional circuit requirement in the transistor trigger circuits of the prior art is the provision of sufficient triggering current to bring the operation of the circuit beyond the peak of the transistor characteristic. Due to the various impedances in the associated circuitry the sensitivity of the trigger circuit has been relatively poor, requiring a substantial triggering voltage.

The present invention overcomes the difficulties as presented in the prior art by providing a single transistor flip-flop trigger circuit which utilizes a split emitter load line. In the illustrative embodiment of the present invention the emitter has four connections: (1) a resistor connected to the base to provide self-bias in the low-current quiescent condition; (2) a constant-current leakage resistor connected to a relatively high negative potential to provide stability against noise triggering in the low-current quiescent condition; (3) a capacitor to ground to provide low impedance during triggering; and (4) a diode or varistor connected to a holding voltage to provide the high-current point of quiescence or stability. The base is connected to ground through a relatively high resistance, and the collector is connected to a negative potential through a relatively low resistance. The (2) leakage resistor and (4) holding voltage connections from the emitter effectively provide for a split load line that intersects the transistor characteristic in three places even with substantial variation in transistors. The load-line or leakage resistor is effective during low-current conditions and the holding voltage is effective during high-current condition to provide for the bistable operation.

It is then an object of the present invention to provide for a sensitive bistable, single transistor, flip-flop circuit.

Another object of the present invention is the provision of a transistor emitter circuit that effectively provides a split load line.

Still another object of the present invention is the provision of a trigger circuit having a transistor and associated circuitry where different components of said circuitry control the trigger circuit during the various intervals in the sequence of operation.

Still another object of the present invention is the provision of trigger circuits that are relatively independent of the variations of individual transistors.

Still another object of the present invention is to increase the triggering sensitivity of a flip-flop circuit maintaining the stability at the quiescent positions.

Still another object of the present invention is to provide a trigger circuit with sufficient electrical inertia so that once triggering commences, it proceeds from one stable state to the other and does not return to the stable state from which it was triggered without additional external control.

Further objects, features and advantages will become apparent upon consideration of the following detailed description when read in conjunction with the drawing in which.

Figure 1:
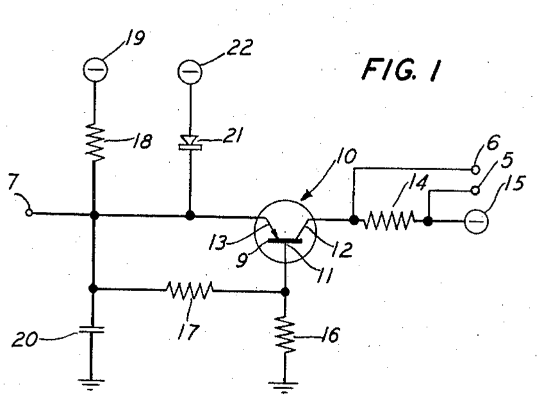
Fig. 1 is a schematic diagram of the bistable flip-flop circuit of the present invention.

The trigger circuit shown in Fig. 1 is of the type described in Patent 2,579,336 of A. J. Rack, issued December 18, 1951, Patent 2,622,212 of A. E. Anderson and R. L. Trent, issued December 16, 1952, and Patent 2,670,445 of J. H. Felker, issued February 23, 1954.

Referring to Fig. 1 the transistor 10 has a block of semiconductive material 9, a base electrode 11, a collector electrode 12 and an emitter electrode 13. As in conventional symbols the emitter 13 is indicated by an arrow with the direction of positive emitter current flow indicated by the direction of the arrow. Thus a transistor having an N-type semiconductive body is indicated by a symbol in which the emitter arrow points toward the base 11, while one having a P-type body is indicated by a symbol in which the emitter arrow points away from the base 11. In Fig. 1 the conventional transistor symbol has the emitter arrow pointing towards the base, and all battery and rectifier polarities are accordingly chosen. The illustrated embodiment of the present invention is not, however, limited to any particular type of transistor. For positive emitter current flow in the opposite direction, all battery and rectifier polarities are reversed from those in Fig. 1.

The collector 12 of transistor 10 is connected through resistor 14 to a negative potential source 15. The resistor 14 is of relatively low resistance, being in the preferred embodiment approximately 2,200 ohms, and the battery 15 which serves to bias the collector in the reverse direction being approximately −40 volts.

The emitter electrode 13 is connected to negative potential represented by battery 19, through the load-line resistor 18 which is large in comparison with the internal emitter resistance of transistor 10. In addition, the emitter 13 is connected to the base 11 through the self-biasing resistor 17, to ground through the capacitor 20 and to holding potential source 22 through varistor 21. The holding potential source 22 supplies a −14 volt potential through the crystal diode, or varistor 21, which is poled in the direction of positive emitter current.

Figure 3:
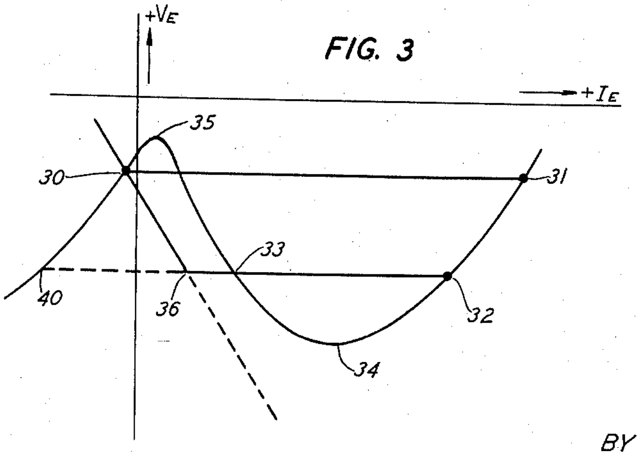
Fig. 3 is a typical emitter voltage-current characteristic curve of a transistor with base-resistance feedback, together with the various load lines of the associated circuitry.

The base electrode 11 is connected to ground through the feedback resistor 16. The relatively large resistor 16 promotes regenerative feedback as is hereinafter described so that the emitter current-voltage characteristic, as shown in Fig. 3, has a region of negative slope bounded on either side by regions of positive slope. The large resistance of the resistor 16 gives the circuit pronounced negative resistance properties.

In the quiescent state, indicated at point 30, Fig. 3, a small current flows from the base electrode 11 to the collector 12 and an almost negligible current flows from the base 11 to the emitter 13. The resistance values of the resistors 18 and 17 are so proportioned as to have this quiescent state occur when the emitter current is zero or a few microamperes negative. The current-voltage characteristic of Fig. 3 shows the low-current quiescent state to occur with a slightly negative emitter current and voltage. The relatively large self-biasing resistor 17 causes the trigger voltage requirement of the circuit to be substantially independent of slow variations in supply voltage and of minor variations in transistor characteristics. The resistor 17 has, however, very little effect on circuit conditions other than low current quiescence since it is paralleled by the emitter-to-base resistance which is only a few hundred ohms.

When a trigger pulse of correct polarity is applied to one of the electrodes, as for example a positive pulse at terminal 7 to the emitter 13 or a negative pulse to the base 11, it raises the emitter voltage to point 35 in Fig. 3, where the emitter current has become slightly positive. As the emitter current becomes positive it causes the collector current to rapidly increase causing the base 11 to become more negative. As the base 11 becomes more negative it increases the potential between the emitter 13 and base 11 causing still more emitter current to flow. The action is cumulative and the emitter current and collector current both increase rapidly. In the specific embodiment of the present invention, as shown in Fig. 1, the emitter 13 is connected to ground through the capacitor 20 which provides for a very low impedance to ground during triggering. This relatively low impedance is shown as the substantially horizontal load line between points 30 and 31 and provides for an almost instantaneous increase in emitter current to a value corresponding with point 31.

The low impedance is required on the emitter 13 to ensure negative resistance in the overall circuit, since the circuit is in effect open-circuit stable from the emitter electrode 13. In addition, since stability tends to prevent triggering, an effective short-circuit or relatively low impedance circuit is desirable at the emitter 13 during triggering. As the positive triggering pulse to the emitter 13 is removed, the current flow, as is hereinafter described, commences to recharge the capacitor 20 in the negative direction and the emitter current commences to reduce along the portion of the characteristic from 31 to 32. If the capacitor 20 maintained its very low impedance, its load line would be maintained and a stable position would be achieved at point 31. The load line of the capacitor 20, however, commences to collapse as the resulting impedance increases, and effectively rotates about point 30 in a clockwise manner towards point 32. If the battery 22 and varistor 21 were not present, the action of which is hereinafter described in detail, the capacitor 20 would continue to be charged negatively mainly through a path from emitter 13 to collector 12, resistor 14, battery 15 to ground to capacitor 20 and back to emitter 13. During this time the current directions are such that the current to the emitter 13 and the current from ground to the base 11 add, flowing to the collector 12. As the emitter current reduces, the capacitor 20, as described above, would become more negatively charged until point 34 is reached at which time the capacitor 20 voltage and base 11 voltage would attain a negative value approaching the voltage of battery 15. The battery 15 supplying voltage from collector 12 to ground would be insufficient to sustain both currents. As point 34 is passed the base 11 would become slightly less negative than the emitter 13 and the emitter current would almost instantaneously drop, becoming negative and cutting off the collector current. The capacitor 20 would discharge through the self-biasing resistor 17 and base resistor 16 causing the circuit to return to point 30. Without the battery 22 and varistor 21, the circuit would therefore be a single-shot or monostable trigger circuit. The load line 30 to 36 would pass through only one positive resistance portion of the emitter characteristic providing for this monostable operation. The load line from 30 to 31 due to the capacitor 20 would exist only during triggering and so could not provide for a second or high-current quiescent point.

The second stable operating condition is provided by the holding battery 22 and the varistor 21. In effect, the battery 22 is disconnected in the low-current quiescent condition at point 30 in Fig. 3 as the negative voltage of the battery 22 is more negative than the negative potential on the emitter 13. The varistor or diode 21 therefore inhibits current flow therethrough until a circuit condition exists where the emitter 13 becomes more negative than the battery 22. The load line of battery 22 is shown from 36 to 32 with the resistance through diode 21 being considered negligible when passing current.

After a triggering pulse is entered as described above to terminal 7, the capacitor 20 provides a relatively low impedance to ground. The emitter 13 becoming more positive during triggering does not cause a current flow to battery 22. When, however, the capacitor 20 begins to charge negatively through the emitter 13 and collector 12, the potential of the emitter falls as shown in Fig. 3 from 31 to 32. At point 32 the potential of the emitter 11 and negative charge of the capacitor 20 equals the negative voltage of battery 22. A current flows from battery 22 which maintains the charge upon capacitor 20 and the potential upon emitter 11. Point 32 is therefore a second stable position or the high-current quiescent position of the bistable transistor circuit. Varying the voltage of battery 22 would raise or lower the load line 33 to 32 and adding a resistance in series therewith would provide for a larger negative slope. The sensitivity of resetting or return to low-current quiescent position can therefore be accurately controlled.

Briefly summarizing the operation of the trigger circuit or regenerative amplifier of Fig. 1 from its low-current quiescent point 30 to its high-current quiescent point 32, in Fig. 3, the triggering commences with a positive pulse being entered to the emitter electrode 13 through terminal 7. The capacitor 20 provides a very low transient impedance or high indicial admittance at time zero during the instant of triggering from the low to the high-current condition. The connection of the capacitor 20 does not disturb the self-biasing stabilization by the resistor 17. As the positive input pulse commences to subside the capacitor 20 begins to be charged negatively through the emitter 13 and collector 12 path. When the potential upon the capacitor 20 drops to a voltage equivalent to point 32 in Fig. 3, the quiescent point is achieved since the tendency of the potential upon the emitter 13 to rise tends to discharge the capacitor 20, restraining the emitter voltage to that corresponding to point 32 and the tendency of the emitter voltage to drop, causes the emitter 13 to tend to become negative with respect to the holding source 22, causing the varistor 21 to allow a current to flow therethrough, restraining the emitter voltage to a value corresponding to point 32, which is the voltage of the holding source 22.

The resetting operation or the triggering of the circuit from the high-current quiescent position corresponding to point 32 to the low-current quiescent position corresponding to point 30 may be accomplished in a number of ways. A negative pulse can be entered to the emitter 13 through terminal 7 or a positive pulse to the base 11 which is equal to the difference between the voltages corresponding to points 32 and 34 in Fig. 3 or the diode 21 and holding source 22 circuit may be opened. In the latter case when the diode 21 branch is opened, there is no restraining or inhibiting current from the source 22 to restrict the emitter current and potential to values corresponding to point 32. The capacitor 20 will continue to discharge to point 34 in a similar manner as described above for the would-be operation of the circuit without the diode 21 and holding source 22. The collector battery 15 would be inadequate to supply the resulting currents and the emitter current would rapidly drop to a negative value, and as the capacitor 20 discharges would return to the low-current quiescent point 30.

Figure 2:
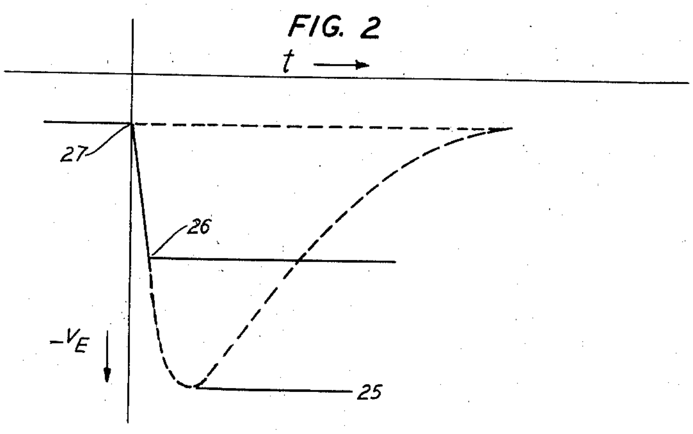
Fig. 2 is an emitter voltage versus time curve illustrating the operation of the present invention.

The voltages upon the emitter 13 during the triggering of the circuit are shown in Fig. 2 where point 27 is the voltage at zero time or at low-current quiescence. The solid line from point 27 to point 26 illustrates the rapid decrease in potential as the current increases from point 30 to point 31 and then drops to point 32 in Fig. 3. The emitter voltage at point 26 in Fig. 2 therefore corresponds to the emitter voltage at point 32 in Fig. 3. If the varistor or diode 21 and holding source 22 were open-circuited as described above, the emitter voltage would continue to decrease from point 32 to point 34 in Fig. 3 and from point 26 to point 25 in Fig. 2. Thereafter the voltage would increase to a value corresponding to the low-current quiescent point 30 in Fig. 3 or point 27 in Fig. 2.

The importance of the various circuit parameters external to the transistor 10 upon the operation of the trigger circuit in Fig. 1 may be shown more clearly by considering the operation of the circuit in their absence. For example, as described above, the absence of the diode 21 and holding voltage 22 causes the resulting operation of the circuit to be monostable instead of bistable. If the diode 21 were a short circuit, the emitter 13 would be maintained at the voltage of the source 22. Under such a condition, the load line from 30 to 36 in Fig. 3 would not control and the load line from 32 to 36 extended to intersect the negative current positive resistance portion of the characteristic would control with the low-current quiescent point being at point 40. An input pulse to the emitter 13 would have to have a threshold or be of a voltage at least equal to the difference in voltages corresponding to the points 35 and 40 in Fig. 3. The operation of the circuit would otherwise proceed in a similar manner as described above with reference to the circuit when the diode 20 was present, with the exception that a larger input voltage or threshold voltage would be necessary for triggering and the circuit would correspondingly be less sensitive. Opening the shorted varistor branch to reset would allow the load line from 30 to 36 in Fig. 3 of the resistor 18 to control, returning the circuit to point 30 in Fig. 3. Under such an operation with the varistor 21 short-circuited and the holding source 22 open-circuited to reset, there would be two low-current quiescent points 30 and 40 and one high-current quiescent point 32. When the holding source 22 is open-circuited, the circuit would be at the quiescent point 30 and when the holding source 22 is reconnected, the circuit would be at the quiescent point 40.

If the voltage of battery 19 is made more negative, the load-line 30 to 36 would be lowered requiring a greater threshold or input voltage to trigger the circuit. If the voltage of battery 19 is increased, the threshold voltage is decreased until a limiting value, after which the circuit is not bistable but monostable. The split load-line would intersect the emitter characteristic at only one point 32 in Fig. 3, thus providing a high-current point of stability for a monostable circuit. As is well known in the art, exemplified by the above-identified patent to Rack, a positive battery could be connected to the base 11 as a substitution for the negative battery 19.

Between input signals or pulses, the flip-flop circuit or regenerative amplifier has time to accumulate and store energy for a relatively large output pulse from the collector 12 when it is triggered. The output pulse is taken from terminals 5 and 6 which are connected across the resistor 14, in turn connected, as described above, to the collector 12. The gain of a triggered regenerative circuit can be made much higher than that of a linear amplifier of equivalent stability. One might think that such a circuit would have to be made insensitive to prevent triggering due to changes in temperature, etc. As described above, however, the circuit is arranged so that only a sudden change exceeding the threshold, or raising the emitter voltage over that corresponding to point 35, will trigger the circuit. The threshold can be varied over a wide range by adjusting the resistor 18, etc. Slow changes in the transistor 10, circuit elements or input voltages have little effect towards triggering the circuit with even the threshold level remaining constant.

Though the circuit of Fig. 1, as described above, has an input or emitter circuit which is direct current coupled in a circuit sense, it functions as an alternating-current coupled circuit, having the advantages thereof. Functionally the circuit input is sensitive to fast changes and is not sensitive to slow changes or drifts. This circuit performance arises as the input signal must appear between the emitter 13 and base 11. If the input to the emitter 13 or to the base 11 changes slowly, the base 11 or emitter 13 respectively follows, giving little or no emitter-to-base voltage. If the input steps, as described in the triggering operation above, one of the electrodes is anchored at its previous voltage and an emitter-to-base voltage appears. "Fast" or "slow" is measured against the time constant of the capacitor 20 and the emitter-to-base resistance. In the preferred embodiment below, the time constant would be $10^{-4}$ seconds or 100 microseconds.

In the preferred embodiment of the present invention having a high sensitivity in the order of one-half a volt for the triggering pulse without sacrifice for stability, the following circuit parameters are utilized:

| | | |
|---|---|---|
| Resistor **14** | ohms | 2,200 |
| Battery **15** | volts | —40 |
| Resistor **16** | ohm | 6,000 |
| Resistor **17** | do | 20,000 |
| Resistor **18** | megohms | 2 |
| Battery **19** | volts | —160 |
| Capacitor **20** | mf | .01 |
| Battery **22** | volts | —14 |

Although the invention has been described as relating to a specific circuit, other embodiments and modifications will readily occur to one skilled in the art so that the invention should not be deemed limited to the embodiments specifically described.

What is claimed is:

1. A flip-flop trigger circuit comprising a transistor device having a current-amplification factor greater than one, an emitter, a collector and a base; a resistor connected to said base to provide together with said transistor device for a negative resistance characteristic; a source of relatively high negative potential; an emitter resistor connecting said relatively high potential source to said emitter; a source of relatively low negative potential; means for reverse biasing said collector with respect to said base; and an asymmetrically conducting impedance device connecting said relatively low potential source to said emitter to provide with said emitter resistor for a split emitter load line.

2. A single transistor bistable circuit comprising a transistor having a base electrode, a collector electrode and a emitter electrode; a self-biasing circuit connecting said base and emitter electrodes; a load-line resistor connected to said emitter electrode for determining the low-current quiescent position; and a holding circuit connected to said emitter having an asymmetrically conducting impedance device and a holding source connected in series for determining the high-current quiescent position.

3. A single transistor flip-flop circuit comprising a transistor having base, emitter and collector electrodes and an emitter circuit, said emitter circuit comprising a resistor connected to said base electrode to provide for self-biasing in the low-current condition, a constant-current leak resistor connected to said emitter electrode to provide stability against noise triggering in the low-current quiescent condition, a grounded capacitor connected to said emitter to provide low impedance during triggering and a holding circuit comprising an asymmetrically conducting impedance device connected to said emitter electrode to provide a high-current point of quiescence.

4. A single transistor flip-flop circuit comprising a transistor having base, emitter and collector electrodes and an emitter circuit, said emitter circuit comprising a resistor connected to said base electrode to provide for self-biasing in the low-current condition, a constant-current leak resistor connected to said emitter electrode to provide stability against noise triggering in the low-current quiescent condition, a grounded capacitor connected to said emitter to provide low impedance during triggering, and a holding circuit connected to said emitter electrode to provide a high-current point of quiescence, said holding circuit comprising an asymmetrically conducting impedance element connected to said emitter electrode and a holding-current source.

5. A single transistor flip-flop circuit comprising a transistor having base, emitter and collector electrodes and an emitter circuit, said emitter circuit comprising a resistor connected to said base electrode to provide for self-biasing in the low-current condition, a constant-current leak resistor connected to said emitter electrode to provide stability against noise triggering in the low-current quiescent condition, a grounded capacitor connected to said emitter to provide low impedance during triggering and a holding circuit connected to said emitter electrode to provide a high-current point of quiescence, said holding circuit comprising an asymmetrically conducting impedance element, a resistor and a holding-current source.

6. A flip-flop trigger circuit comprising a transistor having an emitter, a collector and a base; a source of relatively high negative potential; an emitter resistor connecting said relatively high potential to said emitter; a relatively low negative potential; an asymmetrically conducting impedance device connecting said relatively low potential to said emitter to provide with said emitter resistor a split emitter load line; and a regenerative resistor connected to said base of said transistor to provide a negative resistance emitter characteristic, said split load line intersecting said negative resistance characteristic in three places.

7. A highly sensitive bistable trigger circuit comprising a transistor having a base, an emitter and a collector electrode; a base resistor connected to said base electrode to provide with said transistor a negative resistance emitter characteristic having a central negative resistance portion continuous with two positive resistance portions; and a split load-line emitter circuit comprising a resistor connecting said emitter electrode and base electrode; a grounded capacitor connected to said emitter electrode; a high impedance load-line resistor connected to said emitter; a high negative source of potential connected in series with said load-line resistor; an asymmetrically conducting impedance device connected to said emitter and a low negative holding potential connected to said asymmetrically conducting impedance device, said asymmetrically conducting impedance device controlling the operation of said circuit upon triggering to provide for a high-current quiescent position.

8. A highly sensitive bistable trigger circuit comprising a transistor having a base, an emitter and a collector electrode; a base resistor connected to said base electrode to provide with said transistor a negative resistance emitter characteristic having a central negative resistance portion continuous with two positive resistance portions; and a split load-line emitter circuit comprising a resistor connecting said emitter electrode and base electrode; a grounded capacitor connected to said emitter electrode; a high impedance load-line resistor connected to said emitter; a high negative source of potential connected in series with said load-line resistor, an asymmetrically conducting impedance device connected to said emitter and a low negative holding potential connected to said asymmetrically conducting impedance device, said varistor controlling the operation of said circuit upon triggering to provide for a high-current quiescent position, said holding potential being disconnected from said asymmetrically conducting impedance device to reset said trigger circuit.

9. A bistable trigger circuit which has a low-current and a high-current quiescent position comprising a transistor device having a plurality of electrodes; a resistor connected to one of said electrodes for determining the low-current quiescent position; a biasing circuit arrangement connected to all of said electrodes; and a holding circuit connected to said one electrode having an asymmetrically conducting impedance device and a holding source for determining the high-current quiescent position.

10. A bistable triggered circuit comprising a current-multiplication transistor including a semiconducting body, a base electrode, an emitter electrode and a collector electrode in contact with said body, an external circuit network interconnecting said electrodes with a common junction point and including a first impedance element connected between said base electrode and said junction point for providing together with said transistor for a negative resistance characteristic, an output second impedance element connected between said collector electrode and said junction point, means serially connected with said first and second impedance elements for applying a bias voltage in the reverse direction between said collector and base electrodes, a non-linear resistance device connected between said emitter electrode and said junction point, and means connected between said emitter and base electrodes for applying a bias voltage in the reverse direction between said emitter and base electrodes, said circuit thereby having a stable state of low-current conduction and another stable state of high-current conduction, and said device being connected so as to have a relatively high resistance while said circuit is in said state of low-current conduction and to have a relatively low resistance while said circuit is in said state of high-current conduction.

11. A triggered circuit as defined in claim 10 wherein said first impedance element is a resistor.

12. A triggered circuit as defined in claim 10 wherein said output second impedance element is a resistor.

13. A triggered circuit as defined in claim 10 wherein means is provided for applying trigger pulses to at least one of said electrodes.

14. A triggered circuit as defined in claim 10 wherein said non-linear resistance device is a rectifier.

15. A bistable triggered circuit comprising a current-multiplication transistor including a semiconducting body, a base electrode, an emitter electrode and a collector electrode in contact with said body, an external network interconnecting said electrodes with a junction point and including a resistor connected between said base electrode and said junction point for providing together with said transistor for a negative resistance characteristic, an output impedance element connected between said collector electrode and said junction point, a first source of voltage serially connected with said impedance element between said collector electrode and said junction point for applying a bias voltage in the reverse direction between said collector and base electrodes, a second source of voltage connected to said emitter electrode for applying a bias voltage in the reverse direction between said emitter and base electrodes, a rectifier connected between said emitter electrode and said junction point, said circuit thereby having a stable state of low-current conduction and another stable state of high-current conduction, said rectifier being poled so as to be nonconducting when said circuit is in said stable state of low-current conduction and so as to be conducting when said circuit is in said stable state of high-current conduction, and a pair of output terminals coupled across said impedance element.

16. A triggered circuit as defined in claim 15 wherein said rectifier is a crystal rectifier.

17. A triggered circuit as defined in claim 15 wherein means are provided to apply trigger pulses of alternately opposite polarity to one of said electrodes.

18. A triggered circuit as defined in claim 15 wherein means are provided to apply trigger pulses of the same polarity alternately to two different ones of said electrodes.

19. A triggering circuit comprising a transistor device having a current-amplification factor greater than one, said transistor device having an emitter electrode, a collector electrode and a base electrode, a base resistor connected to said base electrode for providing together with said transistor device for sufficient regenerative feedback from said collector electrode to said emitter electrode to give rise to a region of negative resistance in the emitter current-emitter voltage characteristic of said transistor, and a circuit branch connected to said emitter electrode comprising in parallel a resistive circuit and a series circuit having a holding source of direct current and an asymmetrically conducting impedance device.

20. A triggering circuit in accordance with claim 19 wherein said asymmetrically conducting impedance device is poled for easy current flow in the direction of positive emitter current.

References Cited in the file of this patent

UNITED STATES PATENTS

| | | |
|---|---|---|
| 2,431,766 | Miller et al. | Dec. 2, 1947 |
| 2,531,076 | Moore | Nov. 21, 1950 |
| 2,533,001 | Eberhard | Dec. 5, 1950 |
| 2,579,336 | Rack | Dec. 18, 1951 |
| 2,594,336 | Mohr | Apr. 29, 1952 |
| 2,622,212 | Anderson et al. | Dec. 16, 1952 |
| 2,629,840 | Weiss | Feb. 24, 1953 |
| 2,670,445 | Felker | Feb. 23, 1954 |
| 2,691,074 | Eberhard | Oct. 5, 1954 |

UNITED STATES PATENT OFFICE

CERTIFICATE OF CORRECTION

Patent No. 2,831,983 April 22, 1958

Bernard Ostendorf, Jr.

It is hereby certified that error appears in the printed specification of the above numbered patent requiring correction and that the said Letters Patent should read as corrected below.

Column 8, line 38, claim 8, strike out "varistor" and insert instead -- asymmetrically conducting impedance device --.

Signed and sealed this 25th day of November 1958.

(SEAL)

Attest:

KARL H. AXLINE

Attesting Officer

ROBERT C. WATSON

Commissioner of Patents